US011662892B2

(12) United States Patent
Gallet et al.

(10) Patent No.: US 11,662,892 B2
(45) Date of Patent: May 30, 2023

(54) SYSTEM AND METHOD FOR CONTENT SHARING

(71) Applicant: AMADEUS S.A.S., Biot (FR)

(72) Inventors: Matthieu Gallet, Villeneuve-Loubet (FR); Nicolas Brayard, La Colle-sur-Loup (FR); Sofiane Nait Ouslimane, Cagnes sur Mer (FR); Jean Mouyade, Mouans Sartoux (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 17/124,725

(22) Filed: Dec. 17, 2020

(65) Prior Publication Data
US 2021/0191601 A1    Jun. 24, 2021

(30) Foreign Application Priority Data
Dec. 20, 2019    (FR) ...................................... 1915259

(51) Int. Cl.
*G06F 3/04842*    (2022.01)
*G06F 16/23*    (2019.01)
(Continued)

(52) U.S. Cl.
CPC ........ *G06F 3/04842* (2013.01); *G06F 9/5011* (2013.01); *G06F 16/2365* (2019.01); *G06F 16/2457* (2019.01); *H04L 41/22* (2013.01)

(58) Field of Classification Search
CPC ............. G06F 3/04842; G06F 16/2365; G06F 16/2457; G06F 9/5011; H04L 41/02; H04L 41/22
See application file for complete search history.

(56) References Cited

U.S. PATENT DOCUMENTS 6,850,917 B1 * 2/2005 Hom .................... G06Q 20/206
                                                                705/18
6,876,977 B1 * 4/2005 Marks .................... G06Q 30/06
                                                              705/26.62
(Continued)

FOREIGN PATENT DOCUMENTS

| EP | 1170690 A1 | 1/2002 |
| EP | 2963567 A1 | 1/2016 |
| WO | WO0133453 A1 | 5/2001 |

OTHER PUBLICATIONS

National Institute of Industrial Property, Preliminary Search Report dated Oct. 5, 2020 in French Patent Application No. 1915259.

*Primary Examiner* — Jeremy L Stanley
(74) *Attorney, Agent, or Firm* — Thompson Hine LLP

(57) ABSTRACT

Method and systems of collaborative content creation performed in a network. Selection data is received from a first computing device at a computing resource. The computing resource selects, based on the selection data, at least one data record of a plurality of data records stored in a database. The selected at least one data record has a first data size. The computing resource creates user interface information of the at least one data record and is configured to allow a second computing device of the plurality of computing devices to display a representation of the selected at least one data record in a user interface of the second computing device. The user interface information has a second data size that is smaller than the first size. The computing resource transmits the user interface information to the second computing device.

14 Claims, 2 Drawing Sheets

(51) Int. Cl.
  *G06F 16/2457*     (2019.01)
  *G06F 9/50*        (2006.01)
  *H04L 41/22*       (2022.01)

(56) References Cited

U.S. PATENT DOCUMENTS

| | | | |
|---|---|---|---|
| 7,287,256 B1* | 10/2007 | Lozben | H04L 67/1095 707/999.202 |
| 8,600,784 B1* | 12/2013 | Ivey | G06F 16/9038 705/5 |
| 8,719,251 B1* | 5/2014 | English | G06F 16/954 707/713 |
| 8,751,272 B1* | 6/2014 | Seybold | G06Q 30/0629 705/6 |
| 9,704,109 B2* | 7/2017 | Geraci | G06Q 10/02 |
| 10,127,590 B2* | 11/2018 | Bawge | G06Q 50/01 |
| 10,127,600 B2* | 11/2018 | Kumar | G06Q 30/0633 |
| 10,169,806 B1* | 1/2019 | Golwalkar | G06Q 30/0633 |
| 10,176,510 B2* | 1/2019 | Sundaresan | G06Q 30/0633 |
| 11,042,918 B2* | 6/2021 | Marchant | G06Q 30/01 |
| 11,138,611 B2* | 10/2021 | Sivan | G06Q 30/0603 |
| 11,163,590 B2* | 11/2021 | Gupta | G06F 16/24539 |
| 2001/0037250 A1* | 11/2001 | Lefkowitz | G06Q 30/0207 705/5 |
| 2003/0225826 A1* | 12/2003 | McKellar | G06F 16/9574 709/203 |
| 2003/0226106 A1* | 12/2003 | McKellar | G06F 16/9574 715/234 |
| 2005/0209896 A1* | 9/2005 | Fauser | G06Q 10/02 705/5 |
| 2005/0216281 A1* | 9/2005 | Prior | G06Q 10/02 705/5 |
| 2006/0106655 A1* | 5/2006 | Lettovsky | G06Q 10/025 705/6 |
| 2007/0162314 A1* | 7/2007 | Gunn | G06Q 50/14 705/5 |
| 2007/0239552 A1* | 10/2007 | Sundaresan | G06Q 10/10 705/26.7 |
| 2008/0189190 A1* | 8/2008 | Ferber | G06Q 30/0613 705/26.41 |
| 2009/0030885 A1* | 1/2009 | DePasquale | G07C 5/008 |
| 2009/0287513 A1* | 11/2009 | Anderson | G06Q 10/02 705/6 |
| 2009/0288012 A1* | 11/2009 | Hertel | G06Q 20/326 715/738 |
| 2010/0306249 A1* | 12/2010 | Hill | G06Q 50/01 707/769 |
| 2012/0072249 A1* | 3/2012 | Weir | G06Q 10/00 705/5 |
| 2012/0123909 A1* | 5/2012 | Kamenov | G06Q 50/14 705/27.1 |
| 2012/0185355 A1* | 7/2012 | Kilroy | G06Q 30/0633 705/26.8 |
| 2012/0197753 A1* | 8/2012 | Kalin | G06Q 30/06 705/26.8 |
| 2012/0253972 A1* | 10/2012 | Oskolkov | G06Q 30/06 705/26.8 |
| 2013/0030949 A1* | 1/2013 | Sundaresan | G06Q 50/01 705/26.7 |
| 2013/0036024 A1* | 2/2013 | Boettcher | G06Q 30/06 705/26.8 |
| 2013/0215116 A1* | 8/2013 | Siddique | G06Q 20/204 345/420 |
| 2013/0218610 A1* | 8/2013 | Mornell | G06Q 30/0605 705/5 |
| 2013/0339068 A1* | 12/2013 | Lee | G07C 9/28 705/5 |
| 2014/0019890 A1* | 1/2014 | Klinger | G06F 16/258 715/762 |
| 2014/0058939 A1* | 2/2014 | Savla | G06Q 20/00 705/42 |
| 2014/0297337 A1* | 10/2014 | Geraci | G06Q 10/025 705/5 |
| 2015/0052054 A1* | 2/2015 | Tanba | G06Q 20/403 705/44 |
| 2015/0161712 A1* | 6/2015 | Ponzetta | G06Q 30/0201 705/7.29 |
| 2015/0178642 A1* | 6/2015 | Abboud | G06Q 10/02 705/5 |
| 2015/0242927 A1* | 8/2015 | Will | G06Q 30/0629 705/26.64 |
| 2015/0286959 A1* | 10/2015 | Hauviller | G06Q 10/02 705/5 |
| 2015/0317611 A1* | 11/2015 | Tag | G06Q 10/02 705/5 |
| 2016/0210602 A1* | 7/2016 | Siddique | G06Q 20/384 |
| 2016/0217046 A1* | 7/2016 | Lamoureux | G06F 40/197 |
| 2016/0352412 A1* | 12/2016 | Di Costanzo | G06F 8/61 |
| 2017/0180352 A1* | 6/2017 | Akbarpour | H04L 63/0815 |
| 2017/0228668 A1* | 8/2017 | Oreif | G06Q 10/025 |
| 2017/0316523 A1* | 11/2017 | Jafri | G06Q 10/02 |
| 2018/0096027 A1* | 4/2018 | Romero | G06F 16/9535 |
| 2018/0211189 A1* | 7/2018 | Bessassi | G06Q 10/025 |
| 2018/0260741 A1* | 9/2018 | Lamoureux | G06Q 30/06 |
| 2020/0145383 A1* | 5/2020 | Fleck | G06F 16/9574 |
| 2020/0174804 A1* | 6/2020 | Gupta | G06F 9/451 |
| 2021/0065015 A1* | 3/2021 | Scott | G06Q 50/01 |

* cited by examiner

SYSTEM AND METHOD FOR CONTENT SHARING

TECHNICAL FIELD

Embodiments described herein relate generally to networked decision supporting tools and more specifically to networked decision supporting tools enabling contributions from multiple sources.

BACKGROUND

The popularity of e-commerce has increased drastically and purchases made via a large range of types of electronic communications devices are commonplace. Such purchases place a great computational burden on the servers hosting e-commerce businesses.

BRIEF DESCRIPTION OF THE DRAWINGS

Embodiments will be understood and appreciated more fully from the following detailed description taken in conjunction with the drawings.

DETAILED DESCRIPTION

Figure 1:
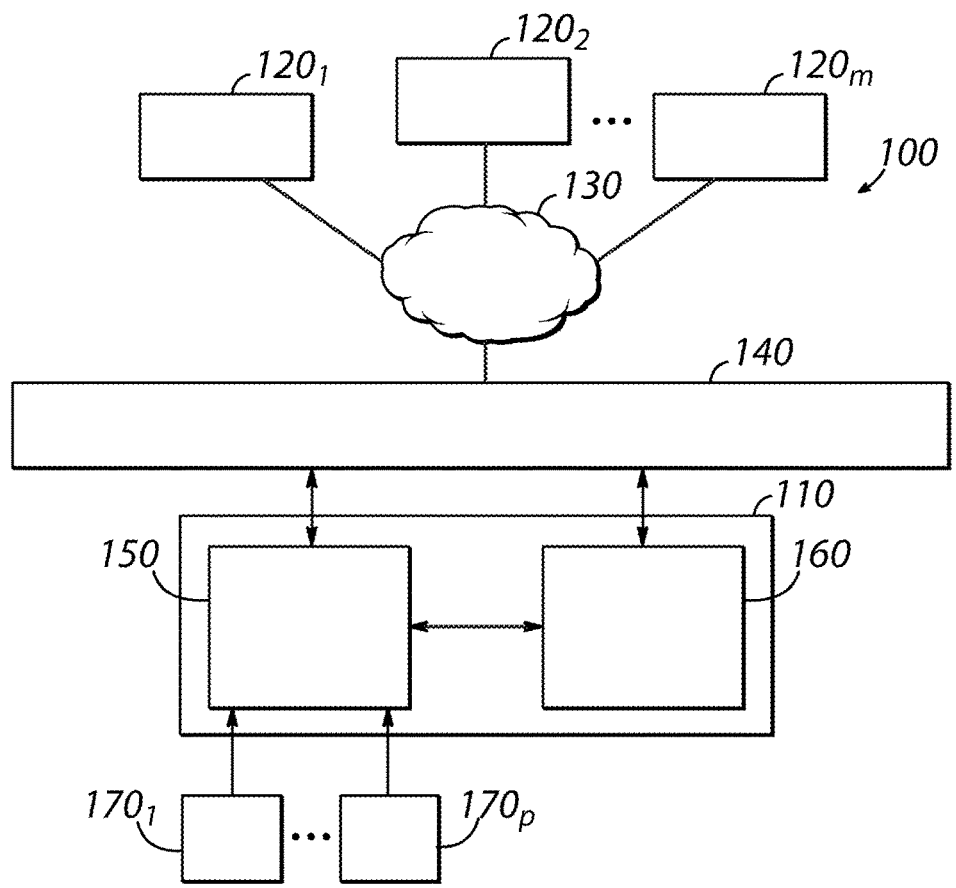
FIG. 1 shows an overview of a communications system in which embodiments can be practiced.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

In embodiments there is provided a method of collaborative content creation performed in a network comprising a plurality of computing devices and a computing resource. The computing resource comprises a database. The plurality of computing devices are communicatively connected to the computing resource. The method comprises receiving, at the computing resource, selection data from a first computing device of the plurality of computing devices, the computing resource selecting from the database, based on the selection data, at least one data record of a plurality of data records stored in the database, the selected at least one data record having a first data size, the computing resource creating user interface information representative of the at least one data record and configured to allow a second computing device of the plurality of computing devices to display a representation of the selected at least one data record in a user interface of the second computing device, wherein the user interface information has a second data size that is smaller than the first size and transmitting the user interface information to the second computing device.

In an embodiment, the method further comprises receiving, at the computing resource from a computing device of the plurality of computing devices, updated selection data. In the embodiment the computing resource updates the data record based on the updated selection data, updates the user interface information based on the updated data record to create updated user interface information, generates a difference between the stored user interface information and the updated user interface information and transmits the difference to the plurality of computing devices communicatively connected to the computing resource.

In an embodiment the plurality of computing devices that are communicatively connected to a computing resource collaborate in a process of selecting data records stored in the database, wherein all of the plurality of computing devices subscribe to a single communications service to facilitate the delivery of real-time updates to all subscribing devices.

In an embodiment all of the plurality of computing devices subscribe to the same websocket/bi-directional/full-duplex service.

In an embodiment the at least one second computing device receives input from a user via the user interface and transmits the received input in real-time to the central computing resource. The central computing resource transmits input received from the at least one second computing device to the first computing device.

In an embodiment the method further comprises updating one or more data records stored within the database after an update trigger event, wherein said update trigger event is at least one of receipt of an instruction to update the one or more data records or selection or modification of a data record linked to the one or more data records.

In an embodiment, the data record comprises a plurality of data entries. The data record persists in the database after all of the computing devices have disconnected from the computing resource. One or more of the data entries is independently updateable within the database. In the embodiment, the method further comprises updating the data record every time a data entry is updated, irrespective of the connection state of the computing devices. In this manner, the database is always up to date so that, once user devices reconnect to the database, the correct data record can be displayed. This makes recovery of display of the data record easy, say following involuntary disconnection of the user devices from the database. It will be appreciated that the state of the data record is independent from the connection state of devices used in creating the data record and/or the devices continuing participation in a booking session. It is consequently possible to retain the data record for an indefinite or freely selectable period of time, for example to make the data record persistent for several months or, say, for a quarter of a year.

According to another embodiment there is provided a method of real-time collaboration between a plurality of computing devices communicatively connected to a computing resource. The plurality of computing devices is connected to a joint communication resource facilitating substantially simultaneous delivery of information from the computing resource to the plurality of computing devices. The computing resource comprises a database storing updateable data records. The computing resource communicates updates to one or more selected data records to the plurality of computing devices via said communication resource.

According to another embodiment, there are provided computer program instructions for execution by one or more processors. The instructions cause the one or more processors, when executed by the one or more processors, to perform a method as described herein.

Preferably, the instructions are stored on a non-volatile storage device.

According to a further embodiment there is provided a computing device comprising a processor and a memory. The computing device is configured to be communicatively connectable to a database and to a plurality of computing devices. The memory stores program instructions that, when executed by the processor cause the processor to receive selection data from a first computing device of the plurality of computing devices, select from the database, based on the selection data, at least one data record of a plurality of data records stored in the database, the selected at least one data record having a first data size, create user interface information representative of the at least one data record and configured to allow a second computing device of the plurality of computing devices to display a representation of the selected at least one data record in a user interface of the second computing device, wherein the user interface information has a second data size that is smaller than the first data size and transmit the user interface information to the second computing device.

In an embodiment the program instructions are further configured to, when executed by the processor, cause the processor to receive from a user device of the plurality of computing devices updated selection data, update the data record based on the updated selection data, update the user interface information based on the updated data record to create updated user interface information, generate a difference between the stored user interface information and the updated user interface information and transmit the difference to the plurality of computing devices communicatively connected to the computing resource.

In an embodiment the program instructions are further configured to, when executed by the processor, cause the processor to enable all of the plurality of computing devices to subscribe to a single communications service to facilitate the delivery of real-time updates to all subscribing devices. The single communications service may be a websocket-based.

In an embodiment, the device comprises the database. In the embodiment the program instructions are further configured to, when executed by the processor, cause the processor to update one or more data records stored within said database after an update trigger event. The update trigger event is at least one of receipt of an instruction to update the one or more data records or selection or modification of a data record linked to the one or more data records.

In an embodiment the data record comprises a plurality of data entries, wherein said data record persists in the database after all of the computing devices have disconnected from the computing resource and wherein one or more of said data entries is independently updateable within the database. The program instructions are further configured to, when executed by the processor, cause the processor to update the data record every time a said data entry is updated, irrespective of the connection state of the computing devices.

In another embodiment there is provided a computing resource comprising a joint communication resource communicably connectable to a plurality of computing devices for real-time collaboration between the pluralities of computing devices. The joint communication resource is configured to facilitate substantially simultaneous delivery of information from the computing resource to the plurality of computing devices. The computing resource comprises a database storing updateable data records. The computing resource is configured to communicate updates to one or more selected data records to the plurality of computing devices via the communication resource.

Networked systems allow multiple entities to access a network resource simultaneously. The multiple entities may desire to simultaneously or substantially simultaneously be informed of a current state of the network resource. This information may be desired or necessary to allow users of the entities to display a current state of the network resource, for example for the purpose of contributing to a decision making process associated with the network resource. This decision making process may relate to the collaborative booking of goods or services, such as, for example to the cooperative creation and modification of a travel itinerary.

The network resource may be a virtual or online shopping cart operated on a centralised computing resource, such as a server or a virtual machine. Online shopping carts are known but shopping carts that can be altered in a reliable and resource effective manner by a number of entities are, to the inventors' knowledge, not known at the time of writing. Whilst embodiments will be described with reference to a multi-party shopping cart for collaborative booking of travel services, embodiments are not limited to this specific example. Other embodiments may relate to other centrally administered information that is also subject to rapid change and that is disseminated to a plurality of parties connected to a service that manages the information.

Rapid change is change that can occur at any time and is likely to occur at least once and likely more than once within the space of minutes, hours, days or weeks. Travel information in particular is subject to rapid change as the services offered by travel service providers are intended to be fully utilised by the time of travel, so that flights, hotels and car rentals, etc. are fully booked and little or no spare capacity that does not generate revenue remains at the time of service delivery. In terms of the booking process this model means that the availability of a service on offer can undergo rapid change, with availability of a particular service becoming scarce only a short period of time, say a period of hours or even minutes, after the service has been plentifully available. The rapidity of change of the availability of a service does of course depend on the balance between total availability and intensity of interest/the number of interested parties. It will nevertheless be appreciated that, even in a system in which information does not change rapidly at times, the rate of information change can be larger at other times. In an embodiment, a system is provided that can cope with either situation.

Moreover, online purchasing platforms may apply dynamic pricing policies to goods or services on offer. A good or service may, for example, be offered for sale at a lower price at a time at which it is in plentiful supply than at a time at which supply has become scarce. Conversely, in an attempt to sell a last few remaining goods or service offerings sales prices may be lowered after a period of high pricing. This contributes to the rapidity of change of the information maintained centrally.

In embodiments in which a central goods or service management platform aggregates goods or service offerings from multiple services, such as, for example for travel data, flight, car hire or hotel booking offerings, information may or even is likely to originate from a number of data sources, say, in the example, from an airline offering the flights, one or more car hire companies or even another platform that aggregates the offerings of an number of car hire companies and various hotels, hotel chains or hotel booking aggregators. In such situations, changes in the data are not under the control of the central resource that is configured to coordinate the offering of the various goods or services to networked entities. One result of this lack of control is that data updates cannot be coordinated and may be required at any time. This further increased the rapidity of the change in the data.

In a scenario where multiple human users are involved in collaboratively selecting data within the database, say to book services or goods collaboratively, it is important that the database can apply relevant internal updates in a timeframe that allows communicating changes that may affect decisions made by the human users without delay that is noticeable to the human user. For this purpose, it is desirable to provide a mechanism for communicating any such changes to users collaborating in a data selection process in an efficient manner and preferably without risking dependence of the timeliness of user updates on network transmission conditions.

FIG. 1 shows an overview of a system 100 that comprises a central computing resource 110 and a number of user devices $120_1$ to $120_m$ that can communicatively connect to the central computing resource 110 via a network 130 and a communication interface 140. The central computing resource 110 comprises one or more real-time databases 150 and a reservation API 160. The real-time database comprises up-to date information relating to goods or services offered to the users of user devices $120_1$ to $120_m$. Reservation API 160 is configured to facilitate coordination between the booking activities of various users $120_1$ to $120_m$.

Data may be stored in real-time database 150 by computing devices $170_1$ to $170_p$ external to the central computing resource 110. One or more or all of computing devices $170_1$ to $170_p$ may be under the control of the party operating the central computing resource 110. Alternatively, computing devices $170_1$ to $170_p$ may be under the control of parties other than the party operating the central computing resource 110. One or more or all of the computing devices $170_1$ to $170_p$ may, for example, be under the control of service or goods providers, such as a hotel or flight booking site or a car rental site that are not under the control of the party operating the central computing device 110. It will be appreciate that, whilst computing devices $170_1$ to $170_p$ are shown to be outside of the central computing device 110, one or more or all of computing devices $170_1$ to $170_p$ may be part of the central computing device 110, in particular when the one or more or all of the computing devices $170_1$ to $170_p$ are under the control of the party operating the central computing device 110. Conversely, for computing devices $170_1$ to $170_p$ that are not under the control of the party operating the central computing device 110, access to the central computing device 110 may be provided through the communication interface 140, although this is not illustrated in FIG. 1.

In an embodiment, the central computing resource 110 may be a computing resource, such as one or more servers, that is under the exclusive control of the party operating the computing resource 110. In an alternative embodiment the computing resource 110 may be a cloud based computing resource, i.e. a resource in which the reservation API 160 is hosted and the database 150 maintained and updated. An example of a suitable cloud service may be Google cloud but other cloud based services capable of hosting the reservation API 160 and the database 150 may instead be used.

The network 130 may be any type of communication network such as the internet, a LAN or WAN or any other type of computer network, the telephone network or a combination of any of such networks. The purpose of the network 130 is to allow the user devices $120_1$ to $120_m$ to connect to the central computing resource 110 via the communication interface 140, for example in a manner a user would connect to an online shopping portal.

In one embodiment the communication interface 140 is a mobile backend as a service offering that interfaces the central computing resource 110 with a variety of different computing devices $120_1$ to $120_m$, such as mobile computing devices, including mobile phones, tablet computers and laptops or any other computing devices capable of displaying a user interface provided by the reservation API 160 via the communication interface 140 and the network 130 to a user. In an embodiment the communication interface 140 is in particular configured to manage user contacts or accounts on behalf of the computing resource 110, to provide push notifications, text messages, any web based push technology, such as pushlets, web sockets, HTTP server push, long polling and Adobe Flash, among others, or any other suitable way of transmitting messages to user devices and/or to interface to social media sites. In an embodiment, the communication interface 140 comprises or consists of those elements of the Firebase service provided by Google or of mongoDB that are required to provide the above-discussed functionality.

Figure 2:
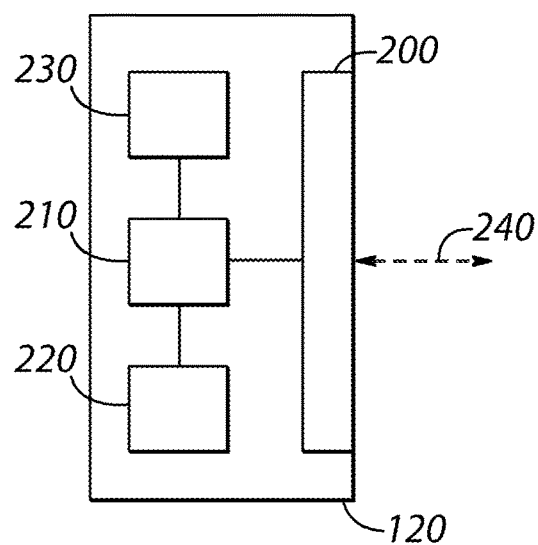
FIG. 2 shows an example of a user device according to an embodiment.

FIG. 2 shows an example of a computing device according to an embodiment. The computing device may be a user device 120 or the computing resource 110. The user device 120 comprises a communications interface 200, a processor 210, a memory 220 configured to be accessed for read and/or write operation by the processor 210 and an I/O interface 230. The memory 220 stores computer program instructions that are configured to cause the processor 210, when executing the computer program instructions, to interact with connected computing devices in the manner described herein. If the computing device is a user device 120, the user I/O interface 230 is configured to display information to a user of the user device 120 and to receive input information from the user. The user I/O interface 230 may, for example, include a display screen for the purpose of displaying a user interface to the user. The display screen may be a touch screen to allow the user to input information, for example to fill in a form presented to the user. Alternatively or additionally, the computing device may comprise other input means, such as a keyboard. The communications interface 200 is configured to connect to one or more communication channels 240 to establish communication with the communications interface 140. It will be appreciated that, if the user device 120 is a wireless device, such as a mobile phone, tablet computer or laptop, the communications interface 200 may be connected to an antenna (not shown) to access a wireless communication channel 240. Alternatively, for stationary user devices 120 a wired connection may be provided to connect to/establish the communication channel 240.

The memory 220 may store computer program instructions 250 that cause the processor 210, when executing the computer program instructions 250, to run a computer application that is configured to communicatively connect with other computing devices, such as the communications interface 140, the user devices 120 or the computing resource 110. Alternatively, the interaction between user devices 120 and the computing resource 110 is entirely browser based. In this case, the computer program instructions 250 cause the user device 120 to operate a browser.

Figure 3:
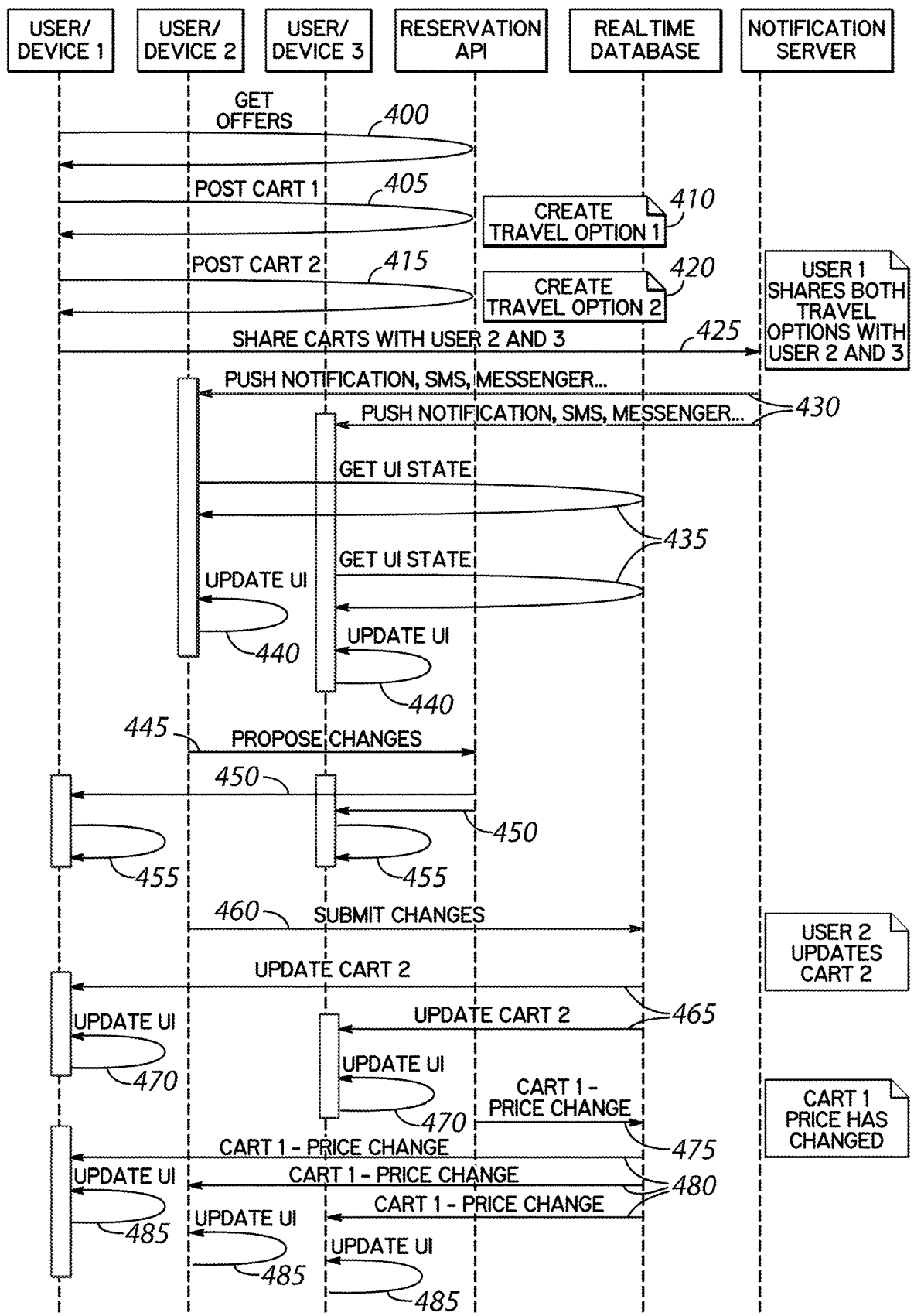
FIG. 3 illustrates data flow in a collaborative communication method.

FIG. 3 illustrates data flow in a collaborative communication method. In the embodiment, three users collaborate using three user devices, user devices 1 to 3. The first user initiates the communication using his/her user device, user device 1. The user initially connects (step 400) to the reservation API 160 to obtain offers available from the computing resource 110. As discussed above, the user device may comprise a dedicated app for presenting acquired offers to the user of the device and or provide the relevant presentation in a browser. The offers presented may include concrete suggestions or adverts. Alternatively or additionally, the app or browser running on the user device includes input fields for population by the user. In an embodiment, every piece of information input by the user in any such input field is streamed from the user device to the real-time database. A user may, for example, start entry of the name of a city he or she wishes to visit or the name or abbreviation of an airport he or she wishes to fly to. The user device is configured to stream individual key strokes to the communications interface 140. The communications interface 140, in turn, is configured to narrow a list of possible destinations to those that may be identified by the information already provided by the user. In an embodiment, such a narrowed list of possible destinations is provided to the user device by the reservation API 160. By streaming information to the users the embodiment avoids the need to use a third party notification system (such as WhatsApp, Mail, SMS, etc.) to notify users.

Once a user has indicated on the user device that a current selection of one or more services or goods is desired, i.e. once the user has posted his or her cart in step 405 to the reservation API 160, the reservation API communicates with the real-time database (step 410) to create a first travel option/shopping cart that is stored in the real-time database. Travel options/shopping carts are sets of references, with individual references identifying corresponding individual data entries in the real time database. This shopping cart constitutes a node to which other users of the system can subscribe using their user devices and may be identifiable using a cart ID. Further travel options may be created by the user of user device 1 by indicating further selections as being desired in step 415. Each time such an indication is provided by the user device to the reservation API 160 a travel option (step 420) is created by the real-time database 150 in an interaction with the API 160.

Up to this point, the only devices that have interacted with each other are the first user device and the reservation API 160. In the embodiment, the user can choose to share the shopping cart with other users. In the embodiment, the reservation API 160 includes functionality enabling such sharing. This may include a software activatable display button or an address field for entry of information identifying one or more users with which the shopping cart is to be shared. Once the user has entered the relevant information, such as, for example, the name of the contact, his or her email address or any identifier that is already known by the computing resource 110, and in particular by the communications interface 140, as being linked to the desired contact or relevant identifiers that allow contacting the desired contact via social media platforms, this information is transmitted by the user device to a notification server. Several ways of inviting other users to collaborate to participate in data selection are disclosed in U.S. Pat. No. 9,704,109, the entirety of which is incorporated herein by this reference.

In an embodiment, the notification server forms part of the communication interface 140 and in particular may be provided by a backend as a service element of the communication interface 140. The notification server is configured to send a notification (step 430) to the parties identified by the information received for user 1. Such notification can take the form of a push notification, an SMS, a Messenger message or, more generally, any type of notification that can be sent from the notification server to users without requiring any action on the part of the user or user device.

In the embodiment, the notifications sent to the second and third users respectively comprise information informing the receiving user that the first user wishes to share the travel option and a means to allow the receiving user to indicate his or her wish to participate in sharing the travel option. To this end the notification may, for example, comprise a link for the receiving user to activate, for example in a browser. Once the receiving user has, via his or her user device, for example by activating a link received from the notification server in step 430, indicated a willingness to participate in the sharing of the travel option, the real-time database provides, in step 435, a user interface state that allows the receiving user device to display the shopping cart to the user.

The user interface state comprises all information necessary to display the current travel option to the user but does not include the complete information that defines the shopping cart. The user interface state includes one or more or all of the following information:
   a. the current URL of the browser
   b. parameters typically used in an online search, such as:
      i. departure airport,
      ii. destination airport and
      iii. travel date
   c. service related information, such as:
      i. booked baggage allowance,
      ii. cabin luggage allowance and cost,
      iii. any included passenger meal
      iv. seat number and/or location, and
      v. permitted lounge access,
   d. information related to meal preference and/or allergies,
   e. selection of on board WiFi,
   f. information relation to the need for special service,
   g. information relation to up or cross-selling to other providers (e.g. airbnb)
   h. information relating to a current panel/screen displayed on a user device, and
   i. information relating to a transition of the displayed panel/screen initiated by the user.
   j. The user interface state has a size of a few bytes.
   k. The entire shopping cart in contrast comprises one or more of all of the following information:
   l. flight information:
      i. departure date,
      ii. departure time,
      iii. departure airport,
      iv. destination airport,
      v. flight number/identifier,
      vi. flight operator,
      vii. flight duration,
      viii. aircraft type,
      ix. outbound fare,
      x. journey code,
      xi. included luggage allowance,
      xii. included meal,
      xiii. seat location (aisle, middle or window),
      xiv. charge for change of itinerary (and if the charge is refundable),
      xv. travel class (economy, business, first . . . ),
   m. passenger information:
      i. passenger age,
      ii. passenger date of birth,
      iii. passenger contact details:
         1. passenger email address
         2. passenger telephone number
         3. passenger address
         4. first name
         5. last name
         6. passenger ID
         7. photograph n. payment details:
   1. payee name
   2. payment type (credit card, apple pay, pay pal)
   3. card type
   4. name on card
   5. card number+CVV
   6. card expiry date.

For journeys that include a number of segments, say a journey comprising one or more stopover flights the above shopping cart information is required for each leg of the journey. This information moreover only relates to a single traveler and a single payer. For group travel, the shopping cart information is moreover required for every traveler and for every payer. Moreover, it will be appreciated that, whilst the above shopping cart information solely relates to a flight booking, it may alternatively relate to the booking of other services or goods. It will also be appreciated that further services, such as a hotel booking or a hire car booking, may be associated with flight bookings. In that situation, additional information is associated with the shopping cart.

Shopping cart information is several hundred kilobytes large. Whilst the transmission of one or only a few shopping carts would likely be manageable transmitting only the much small user interface information is advantageous in a situation in which a large number of booking operations take place at any one time. In this situation, the computing resource 110 has to deal with a volume of data flow that can compromise system performance or even integrity if entire shopping carts have to be transferred to the user devices. By limiting the information transmitted to the user devices to the user interface information the computational resources consumed by the sharing of the travel options is reduced considerably. Moreover, as the content of the shopping cart is never shared, there cannot be any confusion regarding the current/most up-to-date state of the shopping cart. Put in other words, the only and true copy of the shopping cart during its creation is held by the real-time database.

The reservation API 160 accesses the real-time database and abstracts the shopping cart by limiting the amount of data stored to only the data required by the user devices for displaying the current state of the shopping cart to the users, a list of the users involved in a particular booking process, associated booking identifiers and a list of products covered by the booking. The reservation API 160 creates a single user interface state for delivery to all subscribing users. This user interface state is stored in the real-time database, from which it is disseminated to the participating users by the communication interface 140. In this manner updating communication with the user devices can, once the reservation API 160 has abstracted the shopping cart, be managed by the communication interface 140 without involvement of the reservation API 160. The number of communications between the parts of the system 100 located on the computing resource 110 side of the communication interface 140 and the user devices is minimised, given that the communication interface can facilitate communication with the user devices with a single access to the real time database 150, avoiding having to establish time and resource consuming connections between the user devices and the reservation API.

In this manner, a reference point for user devices that have accidentally disconnected is further created, whilst minimising the amount of data that needs to be stored. In one embodiment, the user interface state is user device type independent. In this manner, users are further able to access their current shopping cart using different user devices. The system 100 is consequently multi touchpoint resistant. User interface states or user interface updates created in this abstraction process are then delivered to the users by the communication interface 140. A user interface update comprises only information that distinguishes a newly created user interface state from a previously created user interface state. Information that has already been delivered to the user devices in a previous user interface state or a previous user interface update is already available to the user devices for display of a current user interface state, so that only new information is required to be delivered o he user devices to allow the user device to still display the full up-to-date user interface state. It will be appreciated that, by delivering user interface state updates instead of full user interface states the bandwidth required for transmitting information to the user devices is further reduced. In one embodiment the reservation API 160 stores the derived user interface state and/or user interface state update, for example as an object, a Redux, set of references to the relevant data within the real-time database that are to be delivered to the user for later retrieval by the communications interface to the user devices or similar. As the reservation API 160 abstracts the shopping cart the real-time database 150 only needs to be accessed by a single entity, the reservation API 160, as opposed to multiple times by the users. In this way, the number of shopping carts that a database of a given specification can manage is increased. As discussed above, communication between the reservation API 160 and the user devices $120_1$ and $120_m$ is facilitated by the communications interface 140 based on the user interface updates. In this manner, the processing load of the reservation API 160 is reduced. In one embodiment all user devices $120_1$ to $120_m$ participating in creating a particular shopping cart subscribing to a particular socket and all subscribed user devices receiving an automatic update of the stored user interface state as soon as the state changes. By abstracting the shopping cart data to the above-discussed user interface state the amount of data to be delivered to the user devices is also limited. As discussed above, the data stored in the database can undergo rapid changes. Information reflecting these changes needs to be delivered equally rapidly or at least in a manner that provides updates to the users without perceptible delay. By reducing the size of the data to be transmitted the number of updates that can be communicated to users with a given hardware system is increased.

Once the user device has obtained the user interface information it uses the information to update the user interface displayed to the user in step 440. One of the other users, user 2 in the example shown in FIG. 3, may wish to propose changes to the shopping cart that had originally been proposed by user 1. To facilitate this keystrokes entered by user 2 in his/her user interface are streamed to the reservation API 160 in step 445. The keystroke information received at the reservation API 160 is used by the reservation API 160 to update the current, persistent state of the user interface stored by the reservation API 160. The changes in the user interface state created by this update are in turn streamed to all of the other users participating in the booking process in step 450. During streaming all user actions are ordered and stored. This allows resolution of any conflict between user actions. The other users use the UI state updates to update their respective UIs in step 455.

Once user 2 has decided on desired changes, the user submits these changes to the real-time database 150 in step 460. In an embodiment, the real-time database uses the submitted changes to update the shopping cart to which the changes apply. In an alternative embodiment, the real-time database creates a copy of the shopping cart to which the changes apply and applies the changes to the copy of the shopping cart. In this manner, changes can be undone by reverting to a previous version of the shopping cart. Once the booking process has been completed or terminated all copies of the relevant shopping cart can be deleted.

In step 465 the changes to the shopping cart (or the difference between the new/updated shopping cart and its predecessor if the shopping cart was updated by making a copy of the original shopping cart and altering this copy) are sent to the users that have not requested the shopping cart update (users 1 and 3 in the example shown in FIG. 3). It should be noted that the information sent to the other uses merely represents an update to the previously transmitted information. In this manner, the bandwidth required for transmitting the information is reduced and the responsiveness of the real-time database 150 improved. The transmitted information is used by the users in step 470 to update their respective user interfaces.

Further illustrated in FIG. 3 is a situation in which one of the data points in the real-time database changes. In this instance, the change is brought about by the reservation API 140 informing the real-time database 150 of a price change in step 475. Any such change in a shopping cart resulting from a change in the data is communicated to all users working on the shopping cart in step 480. As discussed above it is only the change in the shopping cart that is transmitted and not the entire shopping cart. In step 485 the users' devices use the received information to update their user interface.

It will be appreciated that steps 475 to 485 may occur at any stage of the sequence of steps shown in FIG. 3.

The shopping carts created in the embodiment are persistent and can be stored for a period of time even in situations in which all users 120₁ to 120ₘ have disconnected from the communications interface 140. In the embodiment all stored shopping carts are continuously updated by the real-time database every time a change relating to an element/object in the shopping cart changes so that all stored shopping carts are up-to-date at all times. In an alternative embodiment, if a user device 120₁ to 120ₘ returns to the stored shopping cart, the real-time database 150 updates the content of the shopping cart.

As discussed above, the system disclosed herein can allow multiple users to pay for parts of the selected service or goods. If the selected service is a journey each user can, for example, pay for his or her own flights and/or accommodation. However, the system is configured to alternatively accept a single payer covering the costs of more than one traveler or even of all travelers. In one arrangement, the system is configured to evenly split total costs by the number of payers, as indicated by a user using a user device.

Whilst users collaborate in selecting data from the database using a plurality of user devices, a booking made based on an agreed data selection is not treated by the system as relating to a plurality of bookings made by individuals. In the travel industry bookings made by individuals are treated as being independent. In an embodiment, in contrast, the system is configured to treat bookings made collaboratively in the manner discussed above in contrast as bookings that are dependent upon each other so that, for example, seats on flights are allocated on a group basis, so that the members of the group are seated together.

In an embodiment, the reservation API is further configured to notify users via their user devices if details of a currently undergoing or previously started booking process have changed. Such notifications may relate to changes in the costs of selected booking options, if the number of items that remain available, say seats on a plane, is lower than the number of selected items or if the available number has reduced in a manner that approaches the number of selected items or if offers associated with a selection have expired.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method of collaborative content creation performed in a network comprising a first computing device, a second computing device, and a computing resource comprising a real-time database, wherein the real-time database, the first computing device, and the second computing device are communicatively coupled to the computing resource via a joint communication resource facilitating simultaneous delivery of information from the computing resource to a plurality of computing devices, and wherein the first computing device and the second computing device are part of a subset of the plurality of computing devices, the method comprising:

receiving selection data from the first computing device at the computing resource, the selection data associated with a modification of a travel itinerary collaboratively booked for the subset of the plurality of computing devices;

selecting, by the computing resource, at least one data record from the real-time database based on the selection data, wherein the at least one data record has a first data size, and wherein the at least one data record is selected based on a determination for limiting an amount of data stored for the at least one record to data required by the plurality of computing devices for displaying a current state of a user interface;

creating, by the computing resource, user interface information representative of the at least one data record and based on the determination for limiting the amount of the data stored for the at least one record, wherein the user interface information is configured to allow the second computing device to display a representation of the at least one data record in a user interface of the second computing device associated with the modification of the travel itinerary, and the user interface information has a second data size that is smaller than the first data size of the at least one data record; and simultaneously transmitting, by the computing resource via the joint communication resource, the user interface information to the second computing device and other devices in the subset of the plurality of computing devices based on a single access to the real-time database.

2. The method of claim 1 further comprising:
receiving, at the computing resource, updated selection data;
updating, by the computing resource, the at least one data record based on the updated selection data;

updating, by the computing resource, the user interface information based on each updated data record to create updated user interface information;
generating a difference between the user interface information and the updated user interface information; and
transmitting the difference to the first computing device and the second computing device.

3. The method of claim 1 wherein the first computing device and the second computing device collaborate in a process of selecting data records stored in the real-time database, and the first computing device and the second computing device subscribe to a single communications service to facilitate delivery of real-time updates to all subscribing devices.

4. The method of claim 3 wherein the first computing device and the second computing device subscribe to the same websocket/bi-directional/full-duplex service.

5. The method of claim 1 further comprising:
receiving, by the second computing device, input from a user via the user interface;
transmitting the input in real-time from the second computing device to the computing resource; and
transmitting the input from the computing resource to the first computing device.

6. The method of claim 1 further comprising:
updating one or more data records stored within the real-time database after an update trigger event,
wherein the update trigger event comprises receipt of an instruction to update the one or more data records, or selection of a data record linked to the one or more data records.

7. The method of claim 1 wherein the at least one data record comprises a plurality of data entries the at least one data record persists in the real-time database after the first computing device and the second computing device have disconnected from the computing resource, and one or more of the data entries is independently updateable within the real-time database, and further comprising:
updating the at least one data record every time one of the data entries is updated irrespective of a connection state of the first computing device and the second computing device.

8. A computing device comprising:
a processor; and
a non-transitory storage memory configured to be coupled to a real-time database, a first computing device, and a second computing device, wherein the real-time database, the first computing device, and the second computing device are communicatively coupled to a computing resource via a joint communication resource facilitating simultaneous delivery of information from the computing resource to a plurality of computing devices, and wherein the non-transitory storage memory comprises program instructions that, when executed by the processor, cause the processor to:
receive selection data from the first computing device, wherein the first computing device and the second computing device are part of a subset of the plurality of computing devices, and the selection data associated with a modification of a travel itinerary is collaboratively booked for the subset of the plurality of computing devices;
select at least one data record from the real-time database based on the selection data, wherein the at least one data record has a first data size, and wherein the at least one data record is selected based on a determination for limiting an amount of data stored for the at least one record to data required by the plurality of computing devices for displaying a current state of a user interface;
create user interface information representative of the at least one data record and based on the determination for limiting the amount of the data stored for the at least one record, wherein the user interface information is configured to allow the second computing device to display a representation of the at least one data record in a user interface of the second computing device associated with the modification of the travel itinerary, and the user interface information has a second data size that is smaller than the first data size of the at least one data record; and
simultaneously transmit, via the joint communication resource, the user interface information to the second computing device and other devices in the subset of the plurality of computing devices based on a single access to the real-time database.

9. The computing device of claim 8 wherein the program instructions are further configured to, when executed by the processor, cause the processor to:
receive updated selection data;
update the at least one data record based on the updated selection data;
update the user interface information based on each updated data record to create updated user interface information;
generate a difference between the user interface information and the updated user interface information; and
transmit the difference to the first computing device and the second computing device.

10. The computing device of claim 8 wherein the first computing device and the second computing device collaborate in a process of selecting data records stored in the real-time database, and the first computing device and the second computing device subscribe to a single communications service to facilitate delivery of real-time updates to all subscribing devices.

11. The computing device of claim 10 wherein the single communications service is websocket-based.

12. The computing device of claim 8 wherein the program instructions are further configured to, when executed by the processor, cause the processor to:
update one or more data records stored within the real-time database in response to an update trigger event,
wherein said update trigger event comprises receipt of an instruction to update the one or more data records, or selection of a data record linked to the one or more data records.

13. The computing device of claim 8 wherein the at least one data record comprises a plurality of data entries the at least one data record persists in the real-time database after the first computing device and the second computing device have disconnected from the computing device, and one or more of the data entries is independently updateable within the real-time database, and the program instructions further configured to, when executed by the processor, cause the processor to:
update the at least one data record every time one of the data entries is updated irrespective of a connection state of the first computing device and the second computing device.

14. A non-transitory computer-readable storage medium comprising program instructions that, when executed by a processor configured to be coupled to a real-time database, a first computing device, and a second computing device, cause the processor to:
- receive selection data from the first computing device, wherein the real-time database, the first computing device, and the second computing device are communicatively coupled to a computing resource via a joint communication resource facilitating simultaneous delivery of information from the computing resource to a plurality of computing devices, wherein the first computing device and the second computing device are part of a subset of the plurality of computing devices, and wherein the selection data associated with a modification of a travel itinerary is collaboratively booked for the subset of the plurality of computing devices;
- select at least one data record from the real-time database based on the selection data, wherein the at least one data record has a first data size, and wherein the at least one data record is selected based on a determination for limiting an amount of data stored for the at least one record to data required by the plurality of computing devices for displaying a current state of a user interface;
- create user interface information representative of the at least one data record and based on the determination for limiting the amount of the data stored for the at least one record, wherein the user interface information is configured to allow the second computing device to display a representation of the at least one data record in a user interface of the second computing device associated with the modification of the travel itinerary, and the user interface information has a second data size that is smaller than the first data size of the at least one data record; and
- simultaneously transmit, via the joint communication resource, the user interface information to the second computing device and other devices in the subset of the plurality of computing devices based on a single access to the real-time database.

\* \* \* \* \*